Patented June 20, 1933

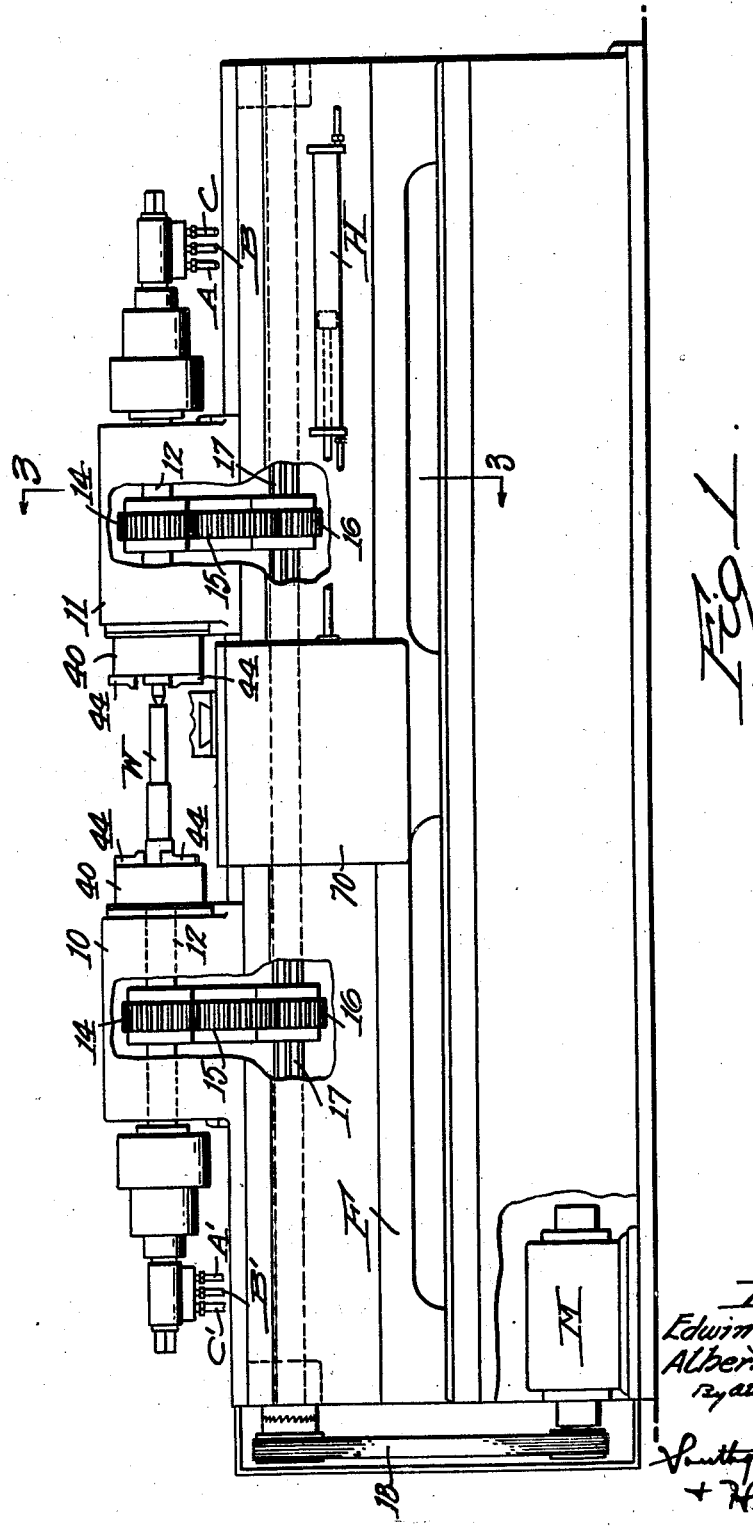

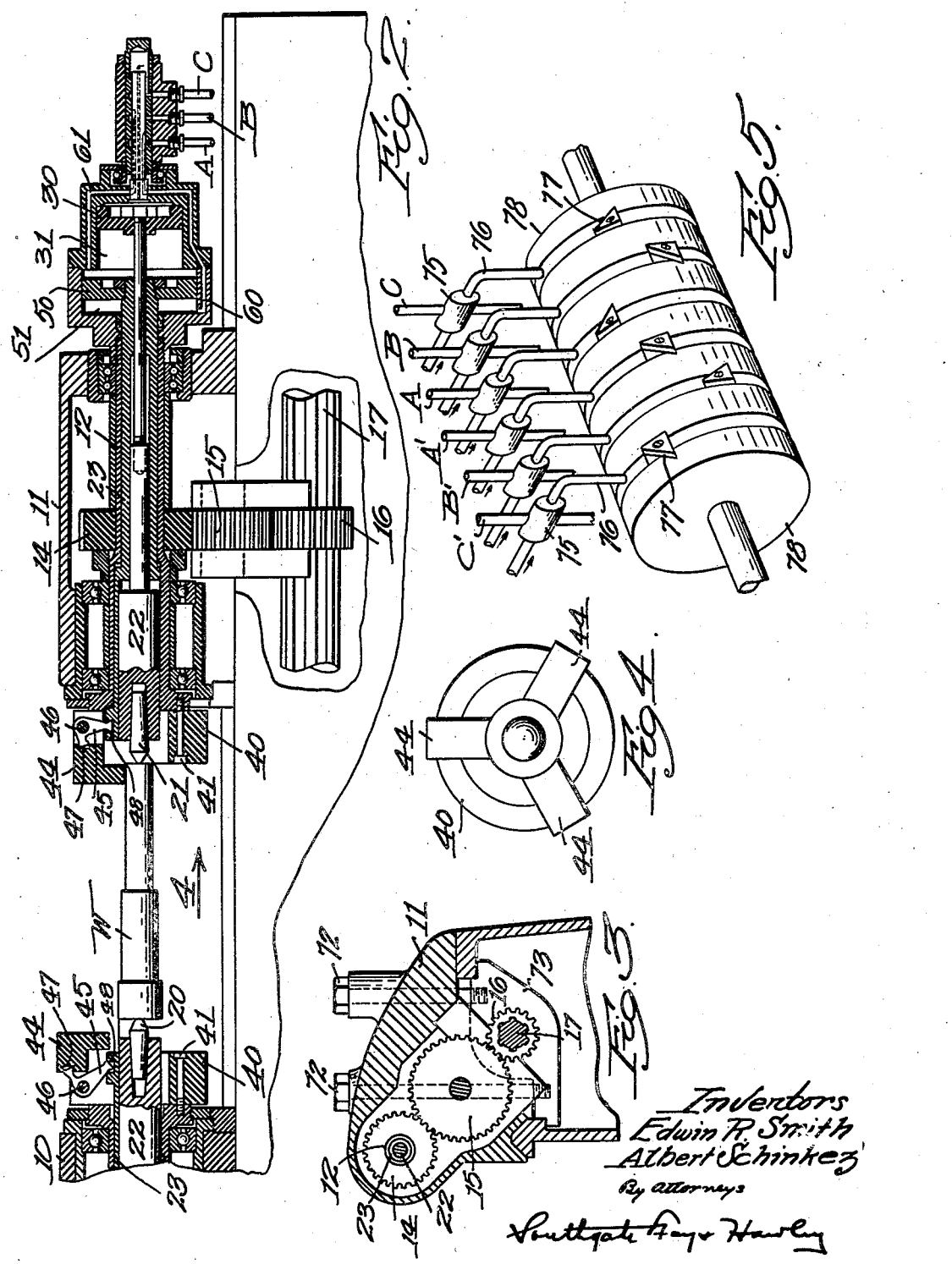

1,914,984

UNITED STATES PATENT OFFICE

EDWIN R. SMITH AND ALBERT SCHINKEZ, OF SENECA FALLS, NEW YORK, ASSIGNORS TO SENECA FALLS MACHINE COMPANY, OF SENECA FALLS, NEW YORK, A CORPORATION OF MASSACHUSETTS

WORK DRIVING MECHANISM FOR MACHINE TOOLS

Application filed September 21, 1931. Serial No. 563,971.

This invention relates to mechanism for supporting and driving a piece of work in a machine tool, such as a grinder or lathe.

Much work is held on centers in such machines and is rotated by some form of chuck or driving attachment at one end of the work. When a piece of work thus supported requires finishing operations on both ends or requires finishing along the sides of the work in both end portions, it is commonly necessary to remove and reverse the work after one end or end portion has been finished.

It is the general object of our invention to provide improved work supporting and work driving mechanism, by means of which the drive may be readily shifted from one end of the work to the other. We further provide means by which the work may be shifted endwise to facilitate a finishing operation on the non-driving end.

Another feature of the invention relates to the provision of hydraulic or fluid-operated means by which the several parts may be conveniently operated in predetermined order.

A preferred form of the invention is shown in the drawings, in which

Fig. 1 is a front elevation of a lathe embodying our improvements, with certain parts broken away;

Fig. 2 is a sectional front elevation of one end of the machine;

Fig. 3 is a detail sectional elevation, taken along the line 3—3 in Fig. 1;

Fig. 4 is an end view of one of the work driving chucks, looking in the direction of the arrow 4 in Fig. 2, and Fig. 5 is a perspective view of certain automatic control mechanism.

Referring to Fig. 1, we have shown our invention embodied in a lathe having a bed or frame F on which work-supporting and driving heads 10 and 11 are mounted for longitudinal adjustment along suitable guideways. The work heads 10 and 11 are provided with hollow drive shafts 12, which are connected by gears 14 and 15 and 16 to an intermediate shaft 17 extending lengthwise of the machine, and connected by a belt or chain 18 to a driving motor M. A suitable change speed mechanism (not shown) may be provided between the motor M and intermediate shaft 17.

The shaft 17 is grooved or splined throughout its length and the gears 16 are slidable thereon, thus providing a positive gear drive for each work head in every longitudinal adjusted position thereof.

The work W is supported on centers 20 and 21, mounted in center-supporting shafts 22, each slidable axially in a sleeve 23, which sleeve in turn is slidable axially in the one of the hollow drive shafts 12 on which the gears 14 are secured.

The center-supporting shafts 22 are provided with pistons 30, mounted in cylinders 31 on the outer ends of the work driving heads 10 and 11. Connections to be described provide fluid-operated means for moving the shafts 22 and centers 20 and 21 toward and from the work.

Chucks 40 are secured by bolts 41 to the enlarged front or inner ends of the hollow drive shafts 12 and are thus positively rotated by the gears 14. A plurality of work-engaging members or jaws 44 (Fig. 4) are movable in radial guideways in each chuck 40.

Bell cranks 45 are pivoted at 46 in radial slots or recesses in each chuck. One arm of each bell-crank is positioned in a recess 47 in the back of a jaw 44, while the other arm of each bell-crank is positioned between lugs 48 on the end of the sleeve 23. At its outer end, the sleeve 23 is provided with a piston 50, slidable in a cylinder 51, also mounted in fixed position in the outer end of the driving head.

Pipes A, B and C are provided for the work head 11, and corresponding pipes A', B' and C' are provided for the work head 10. The pipe A is connected through a passage 60 to admit fluid under pressure to the left-hand side of the piston 50. The pipe B is connected through a passage 61 to supply pressure to the right-hand side of the piston 50 and also to the left-hand side of the piston 30. The pipe C is connected to supply pressure to the right-hand side of the piston 30. The pipes A', B', and C' are similarly connected.

Any suitable and convenient mechanism may be provided for actuating one or more tool slides 70 (Fig. 1), such as a hydraulic piston and cylinder mechanism H. The work heads 10 and 11 may be secured in any adjusted longitudinal position by clamping bolts 72, threaded into a clamping cross bar 73 (Fig. 3).

A series of the three way valves 75 (Fig. 5) are provided, by which any one of the pipes A, B and C or A', B' and C' may be selectively connected to pressure or to exhaust.

For automatic operation, each valve 75 may be provided with arms 76 engaging cam lugs or projections 77 on a rotating index drum 78, preferably making one revolution for each complete cycle of operations of the machine.

Having described the details of construction of our improved machine, the method of operation thereof is as follows:

In starting position, we will assume that the pistons 30 have been moved outward, withdrawing the centers 20 and 21 from operative position, and that the pistons 50 have been moved inward, moving the chuck jaws 44 to outward inoperative position. This is conveniently accomplished by admitting pressure to the pipes B and B', thus causing the pistons 30 and 50 to separate.

A piece of work W is then inserted in the machine and is centered on the right-hand center 21. Pressure is then admitted to the pipe C', advancing the corresponding piston 30 and moving the center 20 inward to engage the work as shown in Fig. 2.

Pressure is then admitted to the pipe A, causing the right-hand piston 50 to be moved outward, thus advancing the jaws 44 in the right-hand chuck 40 to engage the work. In this position it will be noted that the center 20 is so far advanced that operations may be performed upon the left-hand end of the work W without interference by the jaws 44 of the left-hand chuck 40.

When all desired operations have been performed upon the left-hand end portion of the work W, the pipe A is connected to the exhaust and pressure is admitted through the pipe B to move the right-hand piston 50 to the left in Fig. 2, thus moving the jaws 44 in the right-hand chuck 40 outward and away from the work. During this movement, pressure is also admitted through the pipe C to the right-hand side of the piston 30 and at the same time the pipe C is opened to exhaust.

The area on the left-hand side of the piston 30 is reduced by the cross section of the piston rod, causing a differential pressure to be maintained on the right-hand or outer face of the piston 30. This forces the work W to the left, where it may be engaged by the left-hand chuck 40, leaving the right-hand end clear for the tool.

Pressure is now applied to the pipe A' to move the left-hand piston 50 outward or to the left, thus closing the jaws 44 of the left-hand chuck 40 on the work W, after which turning operations may be completed upon the right-hand end of the work. Obviously the order of operation may be reversed and the right-hand end of the work may be finished first if desired.

By a suitable arrangement of lugs 77 on the drum 78, all of the applications of pressure above outlined may be automatically controlled and effected.

We have thus provided a very simple and reliable mechanism for alternately driving a piece of work from opposite ends and for also shifting the work lengthwise to clear the chuck for end-finishing operations. By the use of our improved work-supporting and work-driving mechanism, reversal of the work in the machine and manual shifting of the driving attachments is eliminated and the output of the machine is correspondingly increased.

Having thus described our invention and the advantages thereof, we do not wish to be limited to the details herein disclosed, otherwise than as set forth in the claims, but what we claim is:—

1. In a machine tool, a pair of oppositely disposed work heads, a work center in each head, a work-driving device on each head, means to advance said centers to engage the work, means to shift both centers and the work axially as a unit relative to said heads, and means to cause a selected driving device to engage the work.

2. In a machine tool, a pair of oppositely disposed work heads, a work center in each head, a work-driving device on each head, means to advance said centers to engage the work, means to shift both centers and the work axially as a unit relative to said heads, and means to cause one driving device only to engage the work in one axial working position thereof and the other driving device only to engage the work in the other axial position thereof.

3. In a machine tool, a pair of oppositely disposed work heads, a work center in each head, a work-driving device on each head, means to advance said centers to engage the work, means to shift both centers and the work axially as a unit relative to said heads, and means to cause one driving device only to engage the work in one axial working position thereof and the other driving device only to engage the work in the other axial position thereof, each end of the work being axially clear of its driving device when the other driving device is in position to engage the other end of the work.

4. In a machine tool, a pair of oppositely disposed work heads, a work center in each head, means to move each center axially, a chuck in each head having movable work-engaging members, fluid-operated means for selectively moving said centers axially and said members to operative and inoperative positions, and an automatic device to control said hydraulic means and thereby effect movement of said centers and members in predetermined order.

5. In a machine tool, a pair of oppositely disposed work heads, a work center in each head, means to move each center separately axially and also to move both and the work simultaneously axially as a unit, a chuck in each head having a plurality of radially movable work-engaging jaws, and means to move said jaws radially to engage and disengage the work.

6. In a machine tool, a pair of oppositely disposed work heads, a work center in each head, means to move each center separately axially and also to move said centers simultaneously axially, a chuck in each head having a plurality of radially movable work-engaging jaws, means to move said jaws radially to engage and disengage the work, and a single control device by which all of said movements may be effected in predetermined order.

7. In a machine tool, a work head having a hollow driving shaft, a chuck mounted thereon having a plurality of work-engaging devices, a sleeve slidable in said shaft and connected to move said devices, a work center, a center-supporting shaft slidable in said sleeve, and separate means to move said sleeve and said center-supporting shaft axially to engage and effectively drive the work.

8. In a machine tool, a work head having a hollow driving shaft, a chuck mounted thereon having a plurality of work-engaging devices, a sleeve slidable in said shaft and connected to move said devices, a work center, a center-supporting shaft slidable in said sleeve, a cylinder and piston for moving said sleeve, a second cylinder and piston for moving said center-supporting shaft, and fluid connections and control devices for each cylinder.

9. In a machine tool, a work head having a hollow driving shaft, a chuck mounted thereon having a plurality of work-engaging devices, a sleeve slidable in said shaft and connected to move said devices, a work center, a center-supporting shaft slidable in said sleeve, a cylinder and piston for moving said sleeve, a second cylinder and piston for moving said center-supporting shaft, fluid-connections and control devices for each cylinder, and additional fluid connections and control devices by which both pistons may be moved substantially simultaneously to withdraw said centers and open said chuck.

10. In a machine tool, a pair of oppositely disposed work heads, work-supporting centers in said heads, means to move each center axially, means to apply differential pressure to hold one center in advanced work-engaging position, and means to apply pressure to the other center, thereby overcoming said differential pressure and moving axially both of said centers and the work supported thereby.

11. In a machine tool, a pair of oppositely disposed work heads, a work center in each head, means to move each center axially, a chuck in each head having movable work-engaging members, fluid-operated means selectively operable to move either of said centers axially and also to move both centers and the work axially as a unit, and means to move said work-engaging members to operative and inoperative positions.

12. In a machine tool, a pair of oppositely disposed work heads, a work center in each head, means to move each center axially, a chuck in each head having movable work-engaging members, fluid-operated means selectively operable to move either of said centers axially and also to move both centers and the work axially as a unit, means to move said work-engaging members to operative and inoperative positions, and a single automatic control mechanism for said fluid-operated means and said member moving means.

In testimony whereof we have hereunto affixed our signatures.

EDWIN R. SMITH.
ALBERT SCHINKEZ.